S. E. CREASEY.
NUT LOCK.
APPLICATION FILED JUNE 4, 1914.

1,118,745.

Patented Nov. 24, 1914.

WITNESSES
Edw. Thorpe
C. F. Murdock

INVENTOR
SAMUEL E. CREASEY
BY Munn & Co
ATTORNEYS

UNITED STATES PATENT OFFICE.

SAMUEL ELLIOTT CREASEY, OF ALFRED, MAINE.

NUT-LOCK.

1,118,745.  Specification of Letters Patent.  Patented Nov. 24, 1914.

Application filed June 4, 1914. Serial No. 842,908.

*To all whom it may concern:*

Be it known that I, SAMUEL E. CREASEY, a citizen of the United States, and a resident of Alfred, in the county of York and State of Maine, have invented a new and Improved Nut-Lock, of which the following is a full, clear, and exact description.

Among the principal objects which the present invention has in view are: to provide means for holding two nuts on a bolt, the one from a rotary movement and the other from a longitudinal movement relative to the bolt; to provide means for locking a nut on a bolt, said means being adapted for withdrawal from operative position when engaged by a follower nut; and to provide a follower nut and a relatively slidable member to engage a clamping nut to cut the threads thereof so as to prevent the revolution of the nut on its bolt.

Figure 1:
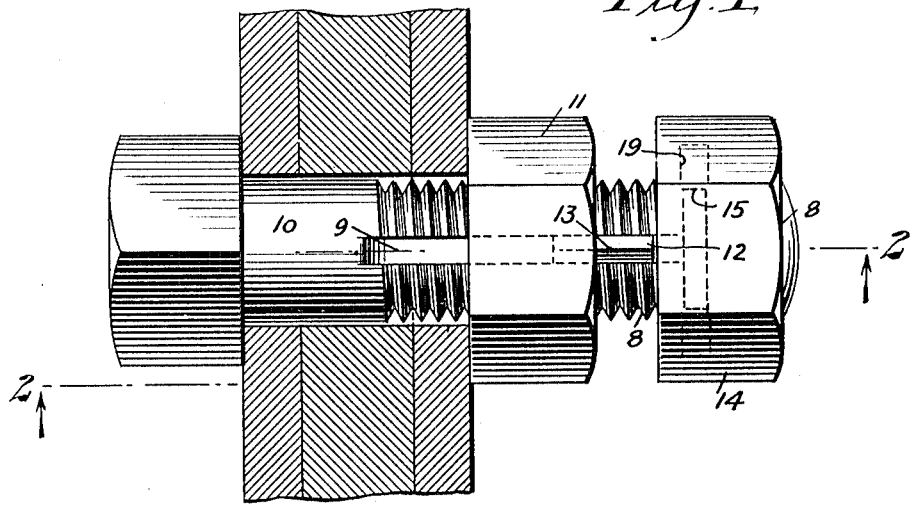
Figure 2:
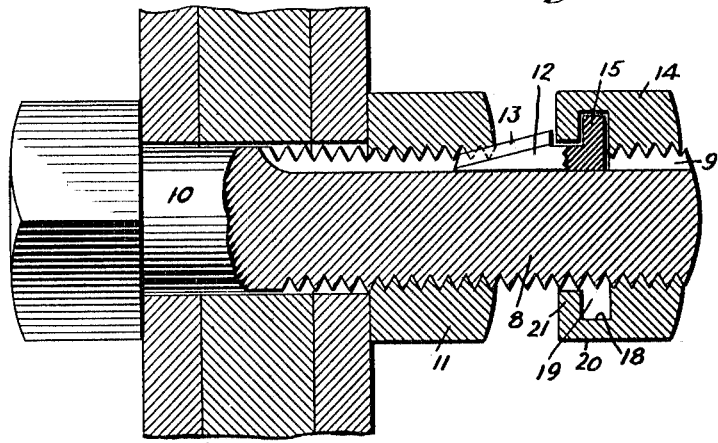
Figure 3:
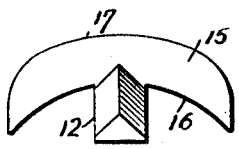

*Drawings.*—Figure 1 is a side view of a bolt, clamping nut, follower nut, and locking wedge, all constructed and arranged in accordance with the present invention; Fig. 2 is a longitudinal section of the same, the section being taken on the line 2—2 of Fig. 1; Fig. 3 is a detail end view, on an enlarged scale, of a locking wedge for connecting the clamping and follower nuts employed in the present invention.

*Description.*—As shown in the accompanying drawings, the bolt, such as that indicated by the numeral 8, is provided with a groove 9 formed lengthwise of the threaded section of said bolt and terminating at the shank 10 thereof. The threads of the bolt 8 are trued or cleared after the groove 9 is formed, to avoid a bur which might otherwise interfere with the threads of the clamping nut 11 when the same is placed upon the bolt 8. The groove 9 is formed as a runway for the wedge 12. The wedge 12 is furnished with a cutting edge 13, the function of which is to cut the thread of the nut 11 when forced thereunder by a follower nut 14. To engage the follower nut 14, and to steady and guide the same while being adjusted to the bolt 8 and to the screw-thread formed thereon, the wedge 12 is provided with a spread head 15, the inner edge 16 whereof is concentric with the bolt 8, and the curve whereof has a slightly greater radius than the top of the thread on said bolt, the object being to clear the same. The outer edge 17 of the head 15 is curved to correspond with the outer wall 18 of an annular groove 19 formed interiorly in the extension 20 with which the nut 14 is provided. The nut 14 is provided with an extension 20, wherein is provided an annular groove 19. The under wall 21 of the extension 20 is centrally perforated to form a bolt-hole having a slightly larger diameter than the thread of the bolt 8. The wall 21 extends to the outer side of the head 15, and in the manipulation of the nut 14, exerts a pull on the wedge 12 to dislodge the same when it is desired to release or remove the nut 11.

*Operation.*—The bolt 8 is placed in service, and the nut 11 is engaged with the threads thereof and set up in clamping relation to the structure to be held, substantially as shown in Fig. 1 of the drawings. The wedge 12 is then introduced into the groove 9, the flange 15 being extended beyond the outer end of the bolt 8 and beyond the terminus of the groove 9. While the wedge is held in this position, the nut 14 is adjusted with relation thereto, the groove 19 being fitted over the flange 15. The nut 14 and wedge 12 are now moved toward the nut 11 until the thread of the nut 14 engages the thread of the bolt 8. As above explained, the operation of engaging the thread of the nut 14 with the thread of the bolt 8 is facilitated by the support and guidance afforded said nut by the head 15. When the thread of the nut 14 engages the thread of the bolt 8, the nut 14 is manipulated in a conventional manner. As said nut advances toward the nut 11, the wedge 12 is carried lengthwise of the groove 9, ultimately having the end thereof inserted under the thread of the nut 11, where the same overhangs the groove 9. When the cutting edge 13 of the edge meets the thread of the nut 11, it is cut or deeply indented by the wedge 12, pressure being applied to said wedge by means of the nut 14. It will be understood that the amount of pressure applied to the wedge 12, and the extent to which it is forced to cut the thread on the nut 11, are optional. The construction is such as admits of a very positive and extensive operation. The strength of the threads of the nut 14 and the bolt 8 forms the limit to which the pressure may be introduced upon the wedge 12.

It is obvious that when the nut 14 and the wedge 12 carried thereby have been fully set up in position, the nut 11 cannot rotate on the bolt 8, and the nut 14 may not rotate backward to move lengthwise of the bolt, the incidental power exerted by the nut 14, outward, being totally inadequate to withdraw the wedge 12 from frictional engagement thereof on the nut 11.

Claims:

1. A nut lock comprising a bolt having a screw-threaded section and a groove formed longitudinally therein; a clamping nut having a thread to fit the threaded section of said bolt; a follower nut having an end extension provided with an interior annular groove; and a wedge adapted for mounting in the groove in said bolt and having an outwardly-extending cutting edge, a portion of said wedge being outwardly extended to fit said groove in said follower nut.

2. A nut lock comprising a bolt having a screw-threaded section and a groove formed longitudinally therein; a clamping nut having a thread to fit the threaded section of said bolt; a follower nut having an end extension provided with an interior annular groove; a wedge adapted for mounting in the groove in said bolt and having an outwardly-extending cutting edge; and a head mounted on said wedge, outwardly-extended therefrom and curved to conform with the annular groove in said follower nut.

3. A nut lock, comprising a bolt having a screw-threaded section and a groove formed longitudinally therein; a clamping nut threaded to fit said section; a wedge mounted in said groove and having an outwardly-disposed cutting edge; and a follower nut operatively engaging said wedge to insert and withdraw the same between and from said bolt and said clamping nut.

In testimony whereof I have signed my name to this specification in the presence of two subscribing witnesses.

SAMUEL ELLIOTT CREASEY.

Witnesses:
HARRY G. LITTLEFIELD,
CHARLES W. LINSCOTT.

Copies of this patent may be obtained for five cents each, by addressing the "Commissioner of Patents, Washington, D. C."